(12) United States Patent
Pahk et al.

(10) Patent No.: US 6,167,634 B1
(45) Date of Patent: Jan. 2, 2001

(54) MEASUREMENT AND COMPENSATION SYSTEM FOR THERMAL ERRORS IN MACHINE TOOLS

(75) Inventors: Heui Jae Pahk; Suk Won Lee, both of Seoul (KR)

(73) Assignee: SNU Precision Co., Ltd., Seoul (KR)

( * ) Notice: Under 35 U.S.C. 154(b), the term of this patent shall be extended for 0 days.

(21) Appl. No.: 09/280,049

(22) Filed: Mar. 29, 1999

(30) Foreign Application Priority Data

Mar. 28, 1998 (KR) .................................................. 98-10851

(51) Int. Cl.[7] .................................................. G01B 7/12
(52) U.S. Cl. .................................................. 33/702; 33/503
(58) Field of Search .................... 33/702, 703, 704, 33/503; 374/142, 179, 166; 700/90, 205

(56) References Cited

U.S. PATENT DOCUMENTS

| | | | | |
|---|---|---|---|---|
| 3,775,655 | * | 11/1973 | Du Vall | 318/634 |
| 3,921,300 | * | 11/1975 | Cox et al. | 33/702 |
| 4,203,225 | * | 5/1980 | Nilsson | 33/832 |
| 4,437,151 | * | 3/1984 | Hurt et al. | 702/95 |
| 4,558,506 | * | 12/1985 | Kielma | 483/43 |
| 4,716,657 | * | 1/1988 | Collingwood | 33/561 |
| 4,777,818 | * | 10/1988 | McMurtry | 73/1.79 |
| 5,111,590 | * | 5/1992 | Park | 33/502 |
| 5,425,375 | * | 6/1995 | Chin et al. | 600/549 |
| 5,479,096 | * | 12/1995 | Szczyrbak et al. | 324/132 |
| 5,758,970 | * | 6/1998 | Aubert | 374/142 |
| 5,834,623 | * | 11/1998 | Ignagni | 702/105 |
| 5,857,777 | * | 1/1999 | Schuh | 374/172 |

FOREIGN PATENT DOCUMENTS

42301 * 2/1990 (JP) .................................................. 33/37

* cited by examiner

Primary Examiner—Diego Gutierrez
Assistant Examiner—Maria Fernandez
(74) Attorney, Agent, or Firm—Lowe Hauptman Gopstein Gilman & Berner

(57) ABSTRACT

A measurement and compensation system for thermal errors in a machine tool is disclosed. A module is provided to compensate thermal errors of the machine tool. The module comprises an operating part, a data bank, an analog to digital converter, a counter and a digital input/output part. The data bank stores in all the coefficients applied to a thermal error modeling equation which governs a relation between temperatures and thermal errors at various operating conditions. The operating part determines all the coefficients of the thermal error modeling equation which are stored in the data bank and calculates the thermal errors corresponding to the temperatures of a plurality of the thermocouples by the temperatures of a plurality of thermocouples inputted from the A/D converter and the positional coordinates of the bed inputted from the counter. Then, digital data of the calculated thermal errors are inputted into the digital input/output part and the digital input/output part converts the digital data to digital signal to input the digital signals into the controller. A controller orders the machine tool to compensate the thermal errors at the positional coordinates of the bed and the feed of the spindle. Accordingly, since the machine tool compensates the thermal errors in advance, the machine tool processes precisely workpieces in spite of the occurrence of the thermal errors.

7 Claims, 8 Drawing Sheets

MEASUREMENT AND COMPENSATION SYSTEM FOR THERMAL ERRORS IN MACHINE TOOLS

FIELD OF THE INVENTION

The present invention relates to a measurement and compensation system, and more particularly to a measurement and compensation system for thermal errors in a guideway and a spindle of a machine tool.

Recently, development of efficient techniques for performance verification of the multiaxis machine tools has been considered as an important task for accuracy enhancement and quality assurance for users and manufactures of machine tools and coordinate measuring machines. In order to perform precise position control and to promote accuracy of the multiaxis machine tools, the development of efficient techniques is directed to compensation of the three dimensional volumetric errors, since it is essential to measure and analyze each error component and to compensate the three-dimensional volumetric errors.

The static errors include geometric errors, kinematic errors, and thermal errors, etc. and dynamic errors include errors due to servo gain mismatch and dynamic characteristics. Considering the thermal errors, the thermal errors are very important because the thermal errors account for 50 percent or more of all the errors. The thermal errors are produced by inward heat and outward heat in machine tools. The inward heat includes heat between two operating members and heat of motors and heat due to friction etc., and the outward heat includes heat due to environmental temperature and heat due to a direct ray of light etc. The heat expands the members of the machine tool and causes the machine tool to be deformed. Therefore, the heat has an important influence on the processing accuracy of the machine tool. However, in practice, it is very difficult to compensate the thermal errors during the operation of the machine tool.

SUMMARY OF THE INVENTION

It is an object of the present invention to provide a measurement and compensation system for thermal errors in a machine tool to compensate thermal errors generated in the machine tool.

It is another object of the present invention to provide a measurement and compensation system for thermal errors in a machine tool wherein the system is additionally mounted to the machine tool as a module.

According to the present invention, these objects are achieved. There is provided a measurement and compensation system for thermal errors in a machine tool comprising, a data bank for storing in operating conditions of a guideway and a spindle of the machine tool, and values of all coefficients of a thermal error modeling equation which governs a relation between thermal errors and temperatures of the guideway and the spindle; a plurality of sensors fixed to a plurality of regions of the guideway and the spindle of the machine tool to measure temperatures of the regions of the guideway and the spindle; an analog to digital converter for converting analog signals of the sensors to digital signal; an encoder provided near the guideway to measure positional coordinates of a bed which moves rectlinearly by means of rotation of the guideway; a counter operatively connected to said encoder for detecting the positional coordinates of the bed by counting pulse signals of said encoder; an operating part for receiving outputs of said analog to digital converter and said counter and for selecting from said data bank the values of all the coefficients of the thermal error modeling equation corresponding to the temperatures measured by said sensors and for calculating the thermal errors; a digital input/output part operatively connected to said operating part for converting digital data of the thermal errors calculated by said operating part to digital signals; a controller for receiving the digital signals of the thermal errors of the guideway and the spindle outputted from said digital input/output part and for receiving the positional coordinates of the bed outputted from said encoder and for giving order to compensate the positional coordinates of the bed by the thermal errors calculated by said operating part; and wherein said data bank, said analog to digital converter, said counter, said operation part, and said digital input/output part are formed by a module.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which the preferred embodiments of the invention are illustrated.

BRIEF DESCRIPTION OF THE DRAWINGS

In the drawings:

FIG. 8A is a graph illustrating first operation condition of the spindle, FIG. 8B is a graph illustrating each temperature change of thermocouples and FIG. 8C is a graph illustrating the thermal errors measured by the gap sensors;

FIG. 9A is a graph illustrating second operation condition of the spindle, FIG. 9B is a graph illustrating each temperature change of thermocouples and FIG. 9C is a graph illustrating the thermal errors measured by the gap sensors.

DETAILED DESCRIPTION OF THE PREFERRED EMBODIMENT

This invention will be described in further detail by way of embodiment with reference to the accompanying drawings.

Figure 1:
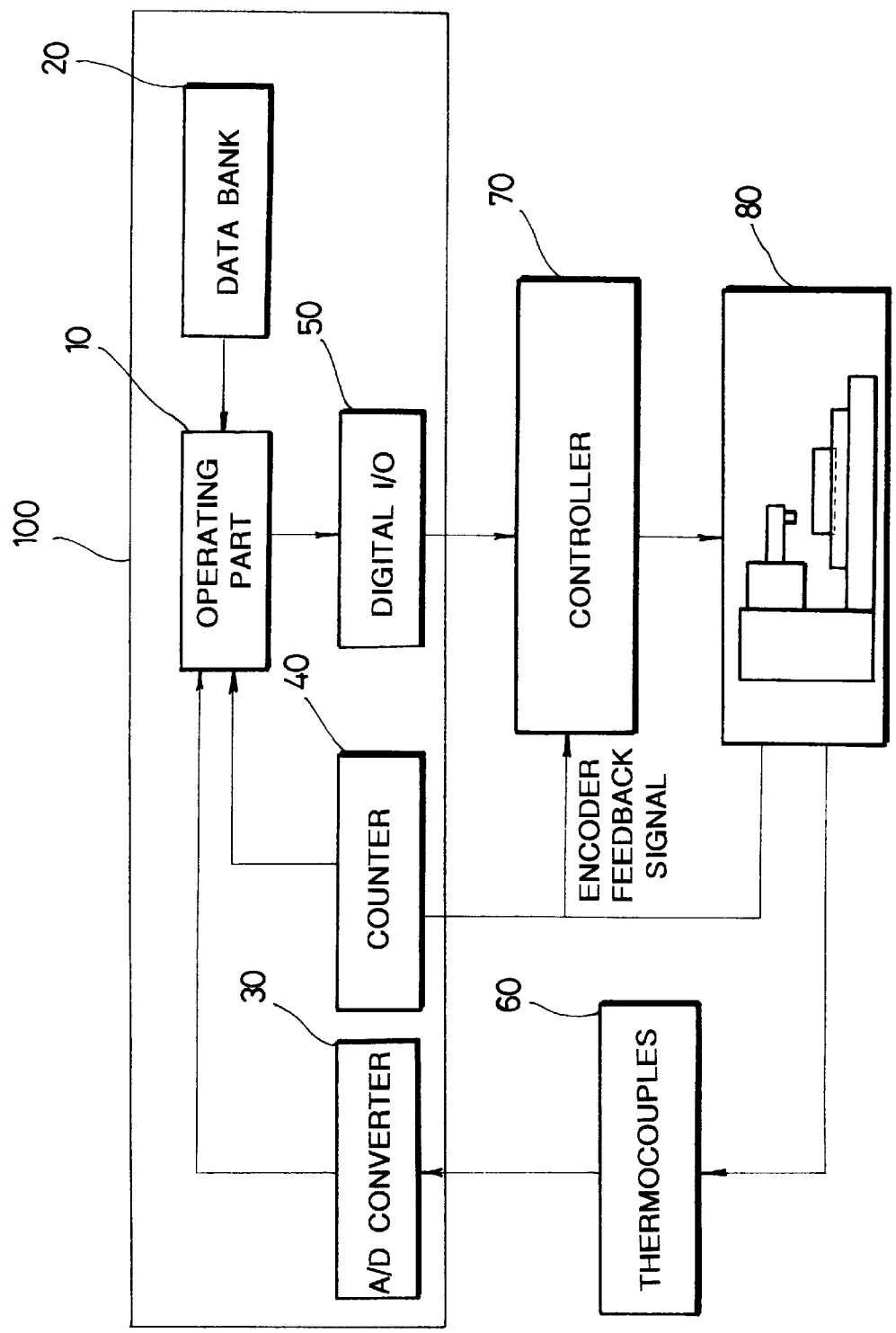
FIG. 1 is a block diagram of a measurement and compensation system for thermal errors in a machine tool according to the present invention.

Referring to FIG. 1, an independent module 100 is provided to compensate thermal errors of a machine tool. The module 100 comprises an operating part 10, data bank 20, an analog to digital converter(hereinafter referred as "A/D converter") 30, a counter 40 and a digital input/output part 50.

The data bank 20 stores in all the coefficients applied to a thermal error modeling equation which governs a relation between temperatures and thermal errors at various operating conditions. The thermal error modeling may selected from well-known modelings, for example, a modeling using linear regression method, a modeling using neural network, and a modeling using thermal modal analysis, etc. According to the selected modeling, the thermal errors and the temperatures of the regions of the heat sources are measured by the experiments. Then, the thermal errors are compensated by inputting the changed position values to the driving motors. For example, the modeling using linear regression method is given as a mathematical modeling function, $\delta = \Sigma a_n \cdot T_n$, where $\delta$ are the thermal errors and $T_n$ are the temperatures of the regions of the heat sources. All the coefficients $a_n$ can be obtained by the $\delta$ and $T_n$ to be measured.

An amplifier 60 amplifies voltages corresponding to temperatures of a plurality of thermocouples which are attached to a guideway and a spindle. The A/D converter 30 converts analog signals of the amplifier 60 to digital signals to apply the digital signals to the operating part 10. An rotary or linear encoder measures positional coordinates of a bed which rectlinearly moves by the rotation of the guideway. The counter 40 counts pulse signals of the encoder and applies the detected positional coordinates of the bed to the operating 10.

The operating part 10 determines all the coefficients of the thermal error modeling equation which are stored in the data bank 20 and calculates the thermal errors corresponding to the temperatures of a plurality of the thermocouples by the temperatures of a plurality of thermocouples inputted from the A/D converter 30 and the positional coordinates of the bed inputted from the counter 40. Then, digital data of the calculated thermal errors are inputted into the digital input/output part 50 and the digital input/output part 50 converts the digital data to digital signal to input the digital signals into the controller 70. The controller 70 orders the machine tool 80 to compensate the thermal errors at the positional coordinates of the bed and the feed of the spindle. Accordingly, since the machine tool compensates the thermal errors in advance, the machine tool processes precisely workpieces in spite of the occurrence of the thermal errors.

In the afore-mentioned embodiment, the module 100 is provided separately from the controller 70 with an input/output connection therebetween. However, the operating part 10, the data bank 20, the A/D converter 30, the counter 40, and the digital input/output part 50 can be directly mounted in the controller 70. Also, an apparatus including the operating part 10, the data bank 20, the A/D converter 30, the counter 40, and the digital input/output part 50 can be connected to the controller 70 to perform serial and parallel communication therebetween by communication ports and cables.

Next, the constitution of the guideway and the spindle and the preparation of the data bank will be explained.

Figure 2:
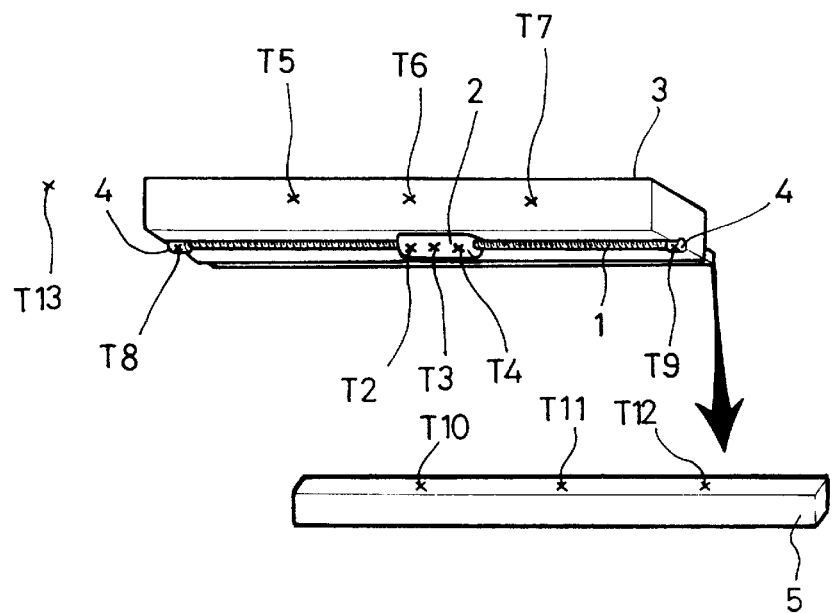
FIG. 2 is a perspective view showing the locations of a plurality thermocouples for measuring temperatures of the regions of the guideway in the machine tool.

Referring to FIG. 2, FIG. 2 shows a plurality of thermocouples which are attached to the guideway. In this embodiment, twelve thermocouples are used to measure the temperatures of the regions of the guideway. Three thermocouples T2,T3,T4 are provided at a nut 2 of a ball screw 1 and three thermocouples T5,T6,T7 are provided at the bed 3 and two thermocouples T8,T9 are provided at both bearings 4 of the ball screw 1 and three thermocouples T10,T11,T12 are provided at the linear encoder 5. Then, a thermocouple T13 is provided at a predetermined position to measure environmental temperature.

Figure 3:
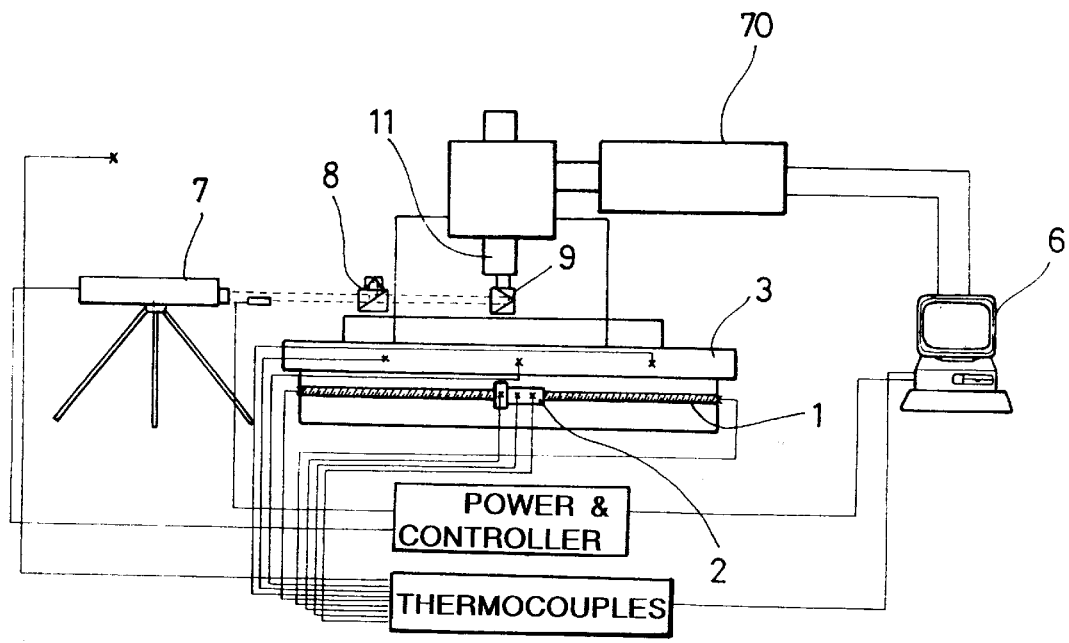
FIG. 3 is a schematic view showing experimental devices for obtaining thermal error data of the guideway to embody the system according to the present invention.

FIG. 3 shows an experimental apparatus for obtaining thermal error data of the guideway to embody the system according to the present invention. The apparatus includes a laser interferometer for measuring positional errors of the guideway and a computer which receives all the data of the thermocouples and the laser interferometer. The laser interferometer includes a laser head 7 for generating laser beam and an interferometer 8 for bifurcating the generated beam and a retroflector 9 for reflecting bifurcated beams. Since the laser interferometer is a well known apparatus, the explanation thereof is omitted in here.

The laser interferometer is provided in a direction of the guideway and the thermocouples T2~T13 are connected to the amplifier 60. The computer 6 obtains distances measured by the laser interferometer and the temperatures of the regions of the guideway via the amplifier 60. The guideway 1 is continuously and repeatedly moved and stopped. The laser interferometer measures continuously moving distances of the guideway and obtains the positional coordinates of the bed 3. Next, after the guideway is returned to the initial position, the temperatures of the regions of the guideway are measured by the thermocouples T2~T13. By repeating the above-mentioned steps, the temperature changes of the regions of the guideway and the positional errors of the guideway can be obtained simultaneously.

Figure 4:
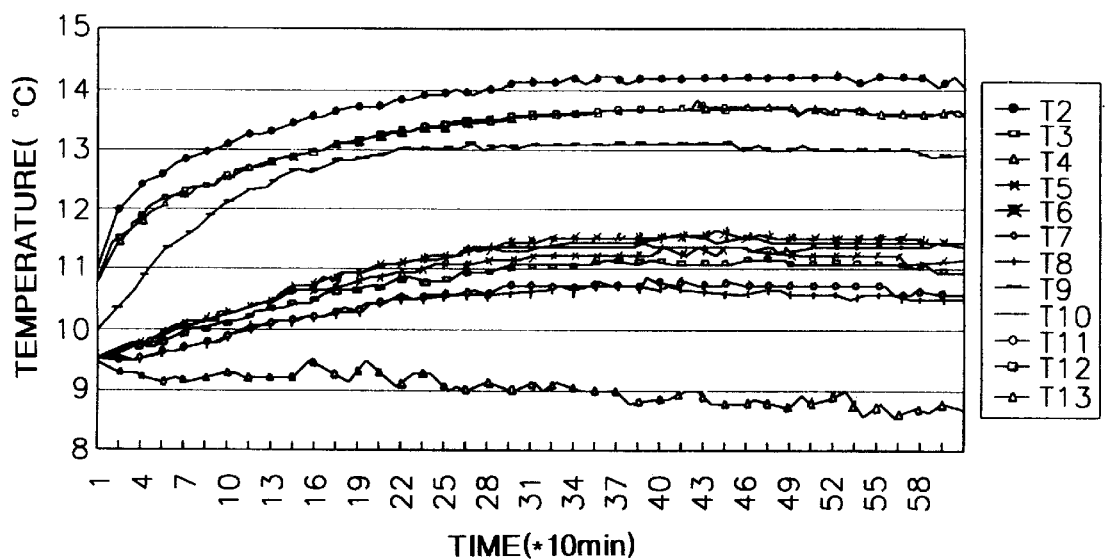
FIG. 4 is a graph illustrating the temperature changes of the regions of the guideway measured by the thermocouples while the guideway is operated.

FIG. 4 illustrates the temperature changes of the regions of the guideway measured by the thermocouples while the guideway is operated. As experimental conditions, the machine tool is operated during six hours and the feed rate for measurement is 500 mm/min and the stopped time is five seconds and three times is repeated. And the feed rate for free feed is 1500 mm/min and five times is repeated. The measurement interval is 100 mm. For overall feeding distance, about ten minutes is required for the process of the temperature measurement, the free feed, the positional error measurement, the temperature measurement per one time. The process is repeatedly carried out sixty times. As shown in FIG. 4, the temperatures of regions of the guideway are divided into three types. First type illustrates rapid temperature increase with 3~4° C. and nearly constant temperature. Second type illustrates slow temperature increase with 2~2.5° C. and nearly constant temperature. Third type illustrates temperature decrease with 0.5° C. The first type takes place in the nut 2 of the ball screw 1 and the right bearing 4 of the ball screw 1 due to friction. The second type takes place in the bed 3 and the linear encoder 5. The third type takes place in the surrounding air of the machine tool. The results of the temperature measurement show that the the machine tool maintains constance temperature distribution with thermal equilibrium after about 3~4 hours. This means that the thermal errors of the machine tool are in saturation.

Figure 5:
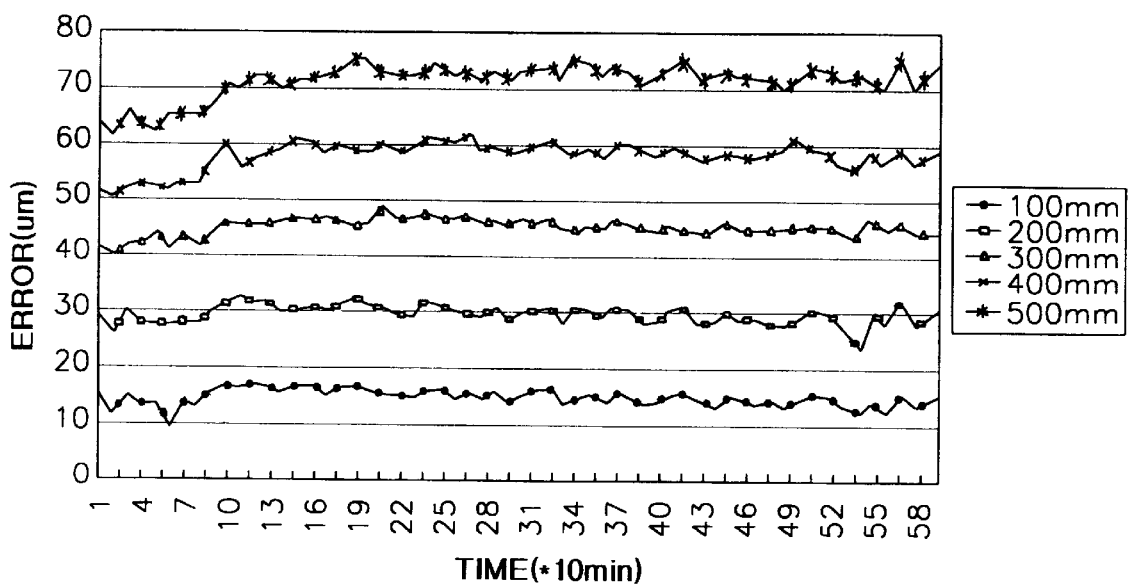
FIG. 5 is a graph illustrating the changes of the positional errors and the thermal errors corresponding to the positions of the bed which moves rectlinearly by the rotation of the guideway.

FIG. 5 illustrates the sum of the positional errors and the thermal errors measured at intervals of 100 mm as time goes by under the same conditions as those of FIG. 4. The longer the feeding distance of the guideway is getting, the more the positional errors increase. Since the thermal errors are added to the positional errors, overall errors of the guideway at each feeding distance gradually increase as time goes by. Accordingly, it can be appreciated that the positional errors and the thermal errors have to be compensated simultaneously in order to compensate the errors of the guideway.

To compensate the thermal errors of the guideway, as mentioned above, the temperatures of the regions of the guideway are measured by the thermocouples T2~T13 for all the operating conditions of the guideway. Then, to make the data bank 20 which stores in all the coefficients applied to a thermal error modeling equation which governs a relation between the temperatures and the thermal errors, all the coefficients are calculated by the measured temperatures and thermal errors. Thereafter, in practical operation of the machine tool, the coefficients corresponding to the measured temperatures in accordance with the operating condition are determined from the data stored in the data bank 20 to calculate the thermal errors of the guideway. Finally, the controller 70 orders the machine tool to compensate the calculated thermal errors.

Now, the measurement and compensation of the thermal errors of the regions of the spindle will be explained.

Figure 6:
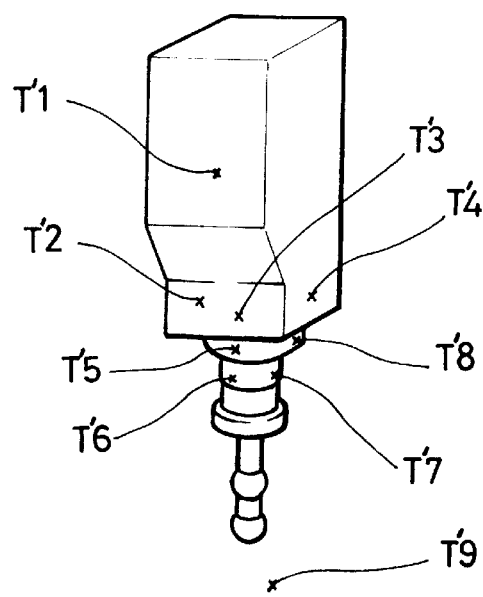
FIG. 6 is a perspective view showing the locations of a plurality thermocouples for measuring temperatures of the regions of the spindle in the machine tool.
Figure 7:
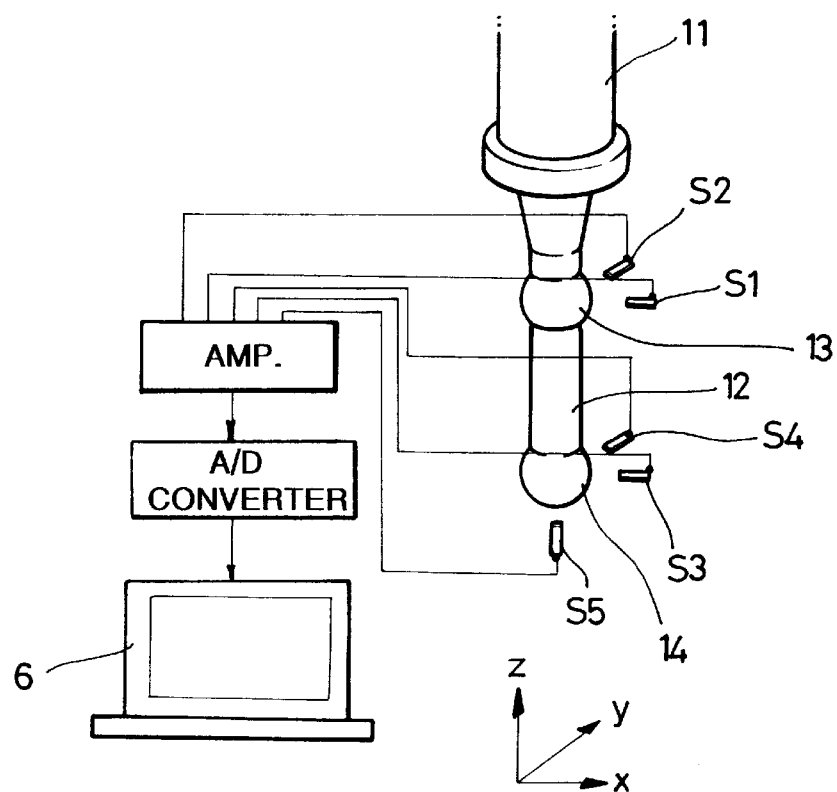
FIG. 7 is a schematic view showing experimental devices for obtaining thermal error data of the spindle to embody the system according to the present invention.

FIG. 6 is a perspective view showing the locations of a plurality thermocouples for measuring temperatures of the regions of the spindle in the machine tool. As shown in FIG. 6, nine thermocouples T'1~T'9 are provided at the regions of the spindle in this embodiment. FIG. 7 shows experimental devices for obtaining thermal error data of the spindle to embody the system according to the present invention. As shown in FIG. 7, a spindle 11 has a master cylinder 12 mounted at a lower end thereof and the master cylinder 12 has two master balls 13,14 provided at an upper end and a lower end, respectively. In order to measure five degrees of freedom of the spindle 11, two gap sensors S1,S2 are attached to the upper master ball 13 and three gap sensors S3,S4,S5 are attached to the lower master ball 14. The gap sensors S1~S5 are connected to an amplifier to convert the outputs of the gap sensors S1~S5 to voltages, and the amplifier is connected to the computer via an A/D converter. The thermal errors of the spindle 11 in x,y,z axes can be measured by the measurement of the displacements of the upper master ball 13 and the lower master ball 14. The computer 6 receives the temperatures measured by the thermocouples T'1~T'9 and the thermal errors measured by the gap sensors S1~S5 to calculate all the coefficients applied to a thermal error modeling equation which governs a relation between the temperatures and the thermal errors. Accordingly, the computer 6 calculates automatically the thermal errors of the spindle 11 using the coefficients and the measured temperature.

Figure 8A:
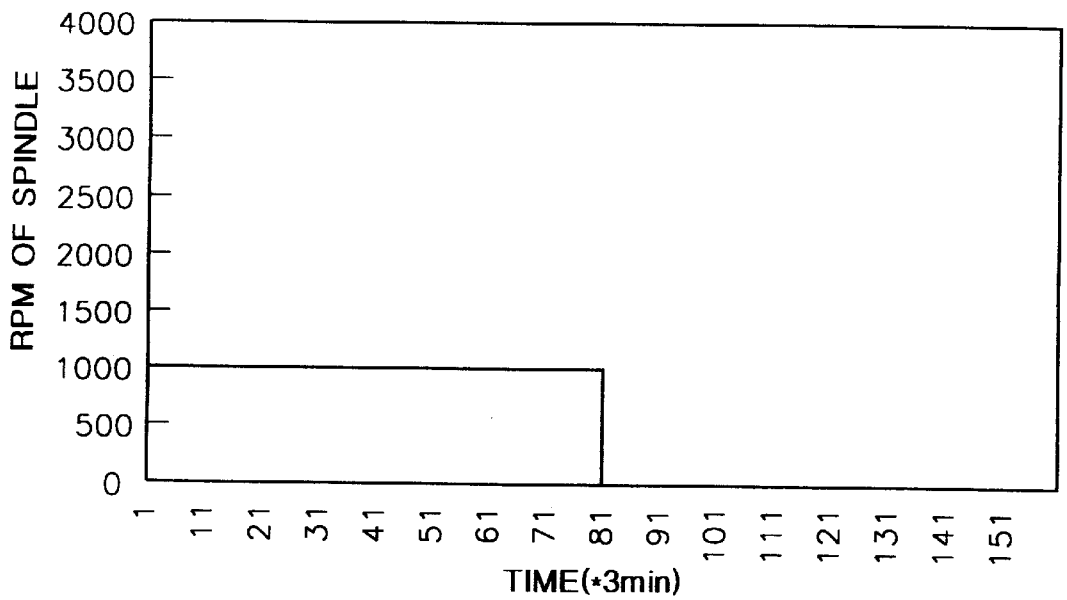
FIG. 8A to FIG. 8C are graphs illustrating first experimental conditions and results thereof where
Figure 8B:
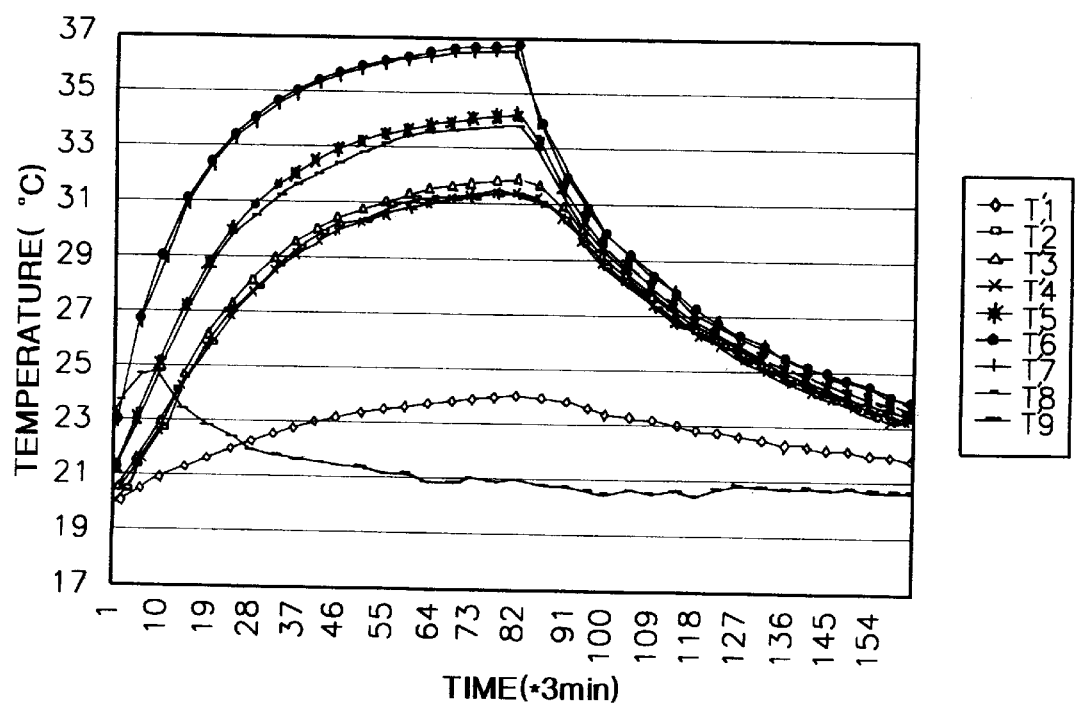
Figure 8C:
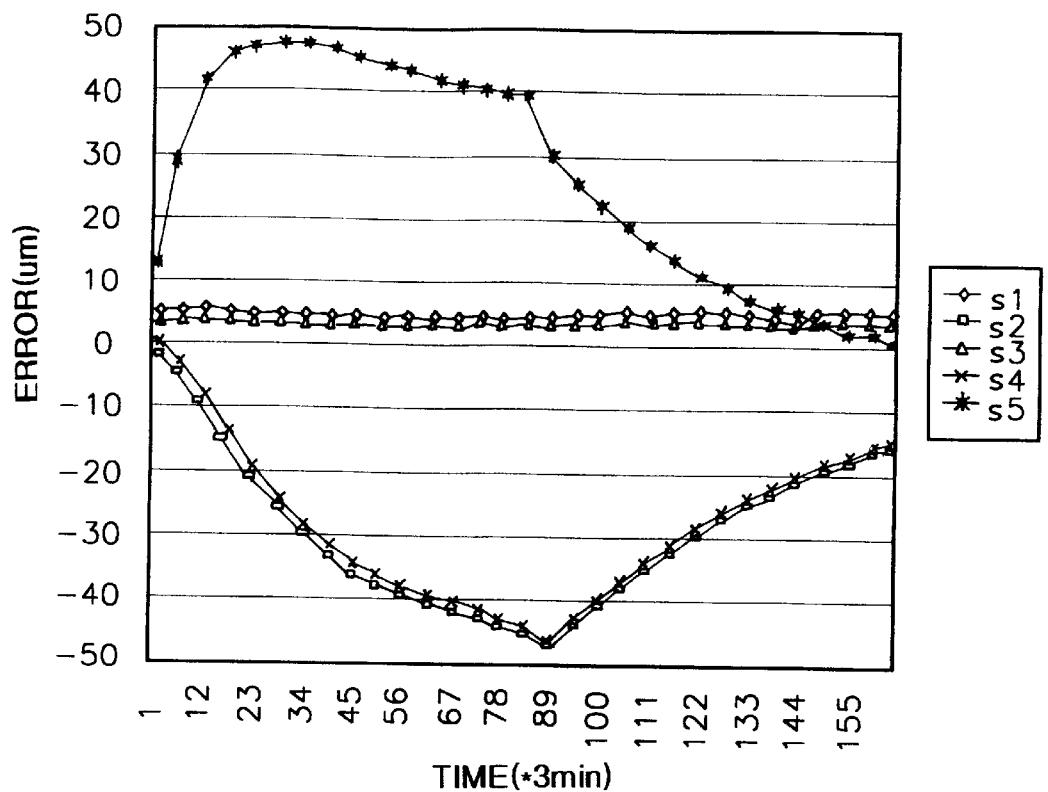

FIG. 8A to FIG. 8C illustrate first experimental conditions and results. FIG. 8A is a graph illustrating an operating condition of the spindle wherein the spindle is operated constantly at 1000 rpm during four hours and then is not operated during four hours. FIG. 8B is a graph illustrating temperature changes of the thermocouples. Referring to FIG. 8B, the temperatures of regions of the bearing measured by the thermocouples T'6, T'7 increase rapidly. Referring to FIG. 8C, the thermal error s5 in z axis and the thermal errors s2, s4 in y axis increase during the operation of the spindle and decrease after the spindle is not operated. And the thermal errors s1, s3 in x axis keep almost constant with no change. Considering the thermal error s5, the error s5 increases rapidly at initial stage since the heat generation takes rapidly place in the regions of the bearing. However, the error s5 continuously decreases to almost zero as time goes by since the outward heat emission continuously increases and thereafter the regions of the bearing keep heat equilibrium. Considering the errors s1, s3 with no change of errors and the error s2, s4 with rapid change of errors, it may be appreciated that the machine tool is symmetric in the direction of x axis and is not symmetric in the direction of y axis.

Figure 9A:
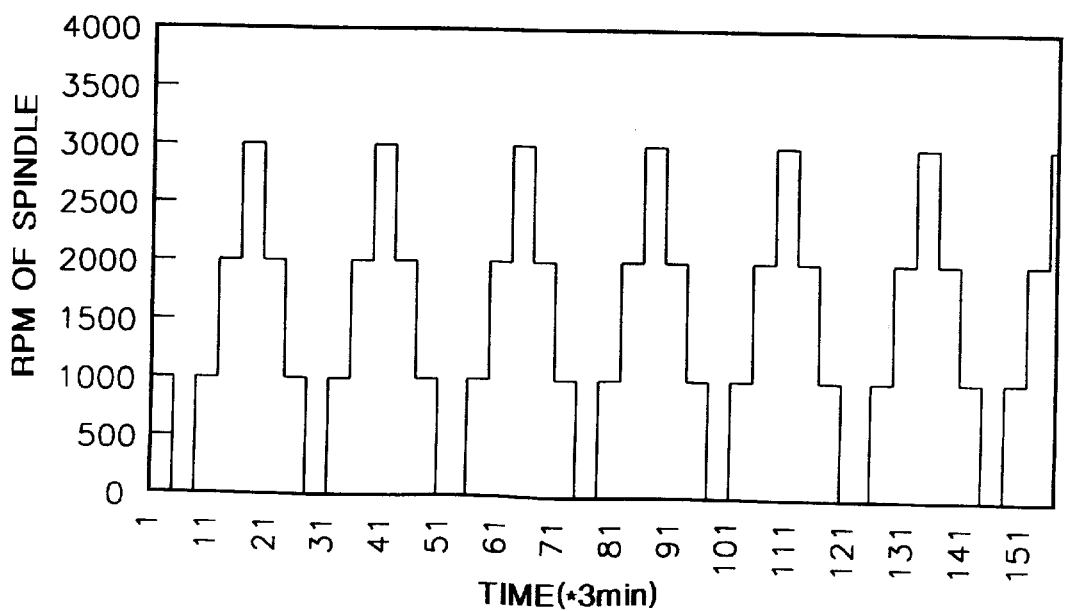
FIG. 9A to FIG. 9C are graphs illustrating second experimental conditions and results thereof where
Figure 9B:
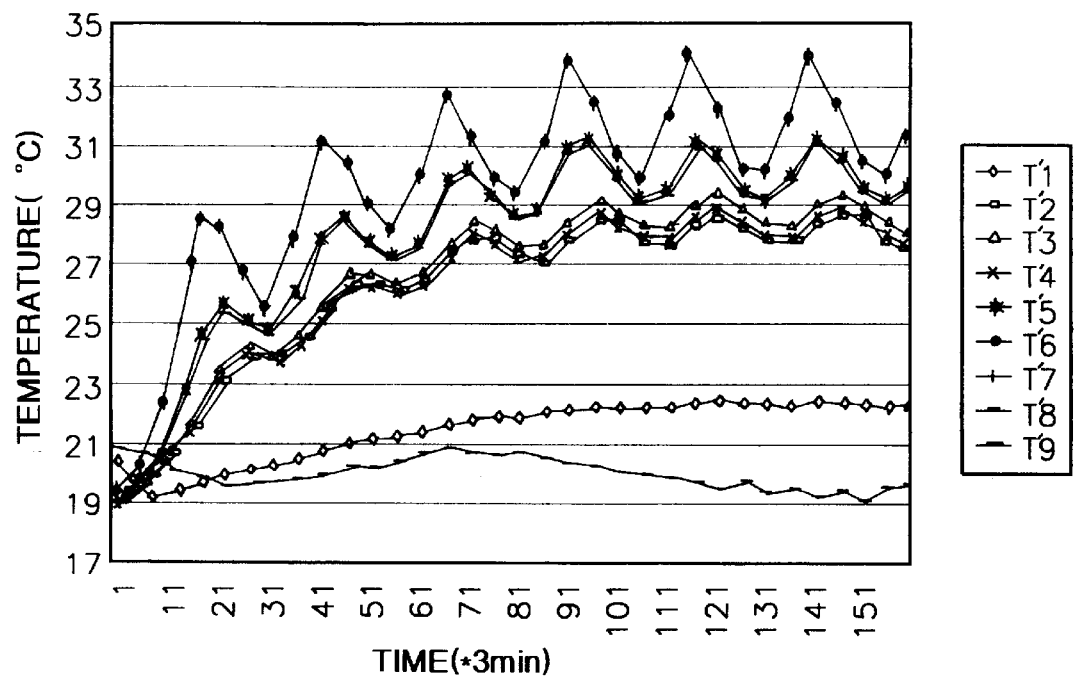
Figure 9C:
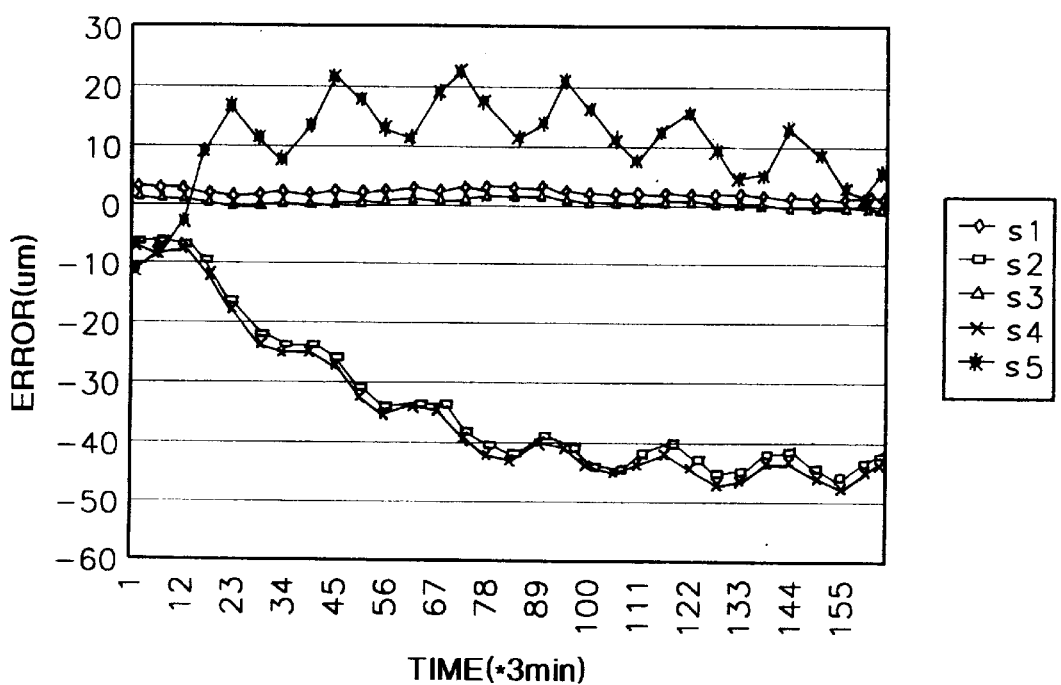

FIG. 9A to FIG. 9C illustrate second experimental conditions and results. FIG. 9A is a graph illustrating an operating condition of the spindle wherein rpm of the spindle is repeatedly given with a constant period. FIG. 9B is a graph illustrating temperature changes of the thermocouples. Referring to FIG. 9B, the temperatures of regions of the bearing measured by the thermocouples T'6, T'7 increase rapidly in the same manner as FIG 8B. Referring to FIG. 9C, the thermal error s5 in z axis increase increases at initial stage and decreases slowly to almost to zero after the regions of the bearing keep heat equilibrium. On the other hands, the thermal errors s2, s4 in y axis increase continuously and the thermal error s1, s3 in x axis keep almost constant with no change. From these facts, it can be seen that the temperatures and the thermal errors of the spindle are changed with periodicity and the heat generated during the operation of the spindle influences fully on the thermal errors.

Figure 10:
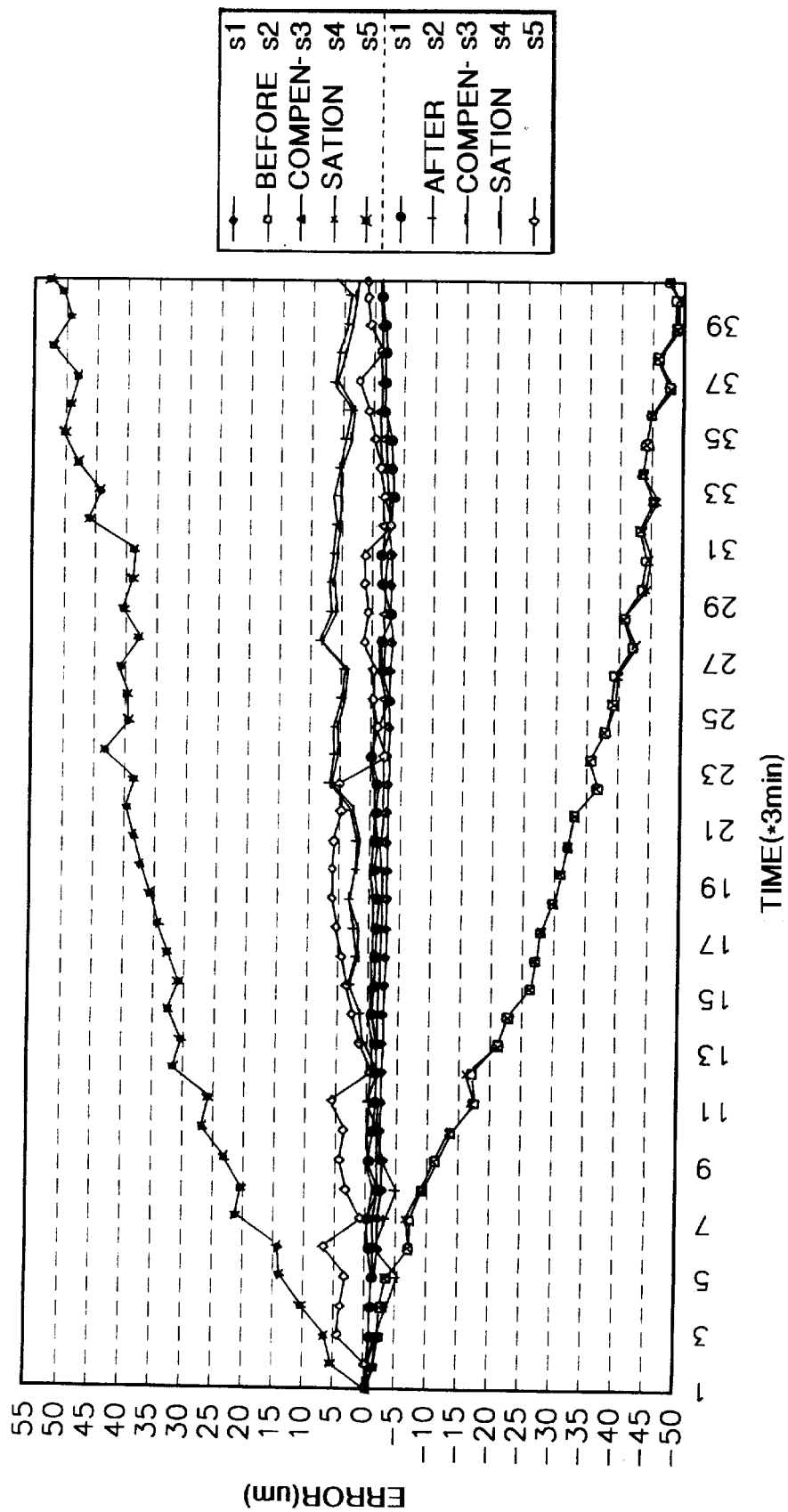
FIG. 10 is a graph illustrating thermal errors before and after the compensation in an operating condition of the spindle.

Finally, FIG. 10 illustrates thermal errors before and after the compensation in an arbitrary operating condition of the spindle. Referring to FIG. 10, it can be seen that the great thermal errors before the compensation generated during the operation of the spindle, that is, the errors s5 in z axis and the errors s2, s4 in y axis is changed to minute errors because the thermal errors are calculated and compensated before the operation of the spindle according the present invention.

On the other hand, from FIG. 8C, FIG. 9C and FIG. 10, it can be seen that the thermal errors s1, s2 measured by the gap sensors S1, S2 are similar to the thermal errors s3, s4 measured by the gap sensor S3, S4, respectively. Accordingly, although five gap sensors S1~S5 are provided in the embodiment of FIG. 7, the only three gap sensors perpendicular to one another, for example, the sensors S1, S2 and S5, can be used to measure the thermal errors of three degrees of freedom in x,y,z axes. Also, the present invention can be applied to all the machines with thermal errors, for example, coordinate measuring machines, feeding machines, etc.

The invention is in no way limited to the embodiment described hereinabove. Various modifications of disclosed embodiment as well as other embodiments of the invention will become apparent to persons skilled in the art upon reference to the description of the invention. It is therefore contemplate that the appended claims will cover any such modification or embodiments as fall within the true scope of the invention.

What is claimed is:

1. In combination, a machine tool having a guideway and a spindle and a measurement and compensation system for thermal errors in a machine tool comprising, a data bank for storing in operating conditions of the guideway and the spindle of the machine tool, and values of all coefficients of a thermal error modeling equation which governs a relation between thermal errors and temperatures of the guideway and the spindle;

a plurality of sensors fixed to a plurality of regions of the guideway and the spindle of the machine tool to measure temperatures of the regions of the guideway and the spindle;

an analog to digital converter for converting analog signals of the sensors to digital signal;

an encoder provided near the guideway to measure positional coordinates of a bed which moves rectlinearly by means of rotation of the guideway;

a counter operatively connected to said encoder for detecting the positional coordinates of the bed by counting pulse signals of said encoder;

an operating part for receiving outputs of said analog to digital converter and said counter and for selecting from said data bank the values of all the coefficients of the thermal error modeling equation corresponding to the temperatures measured by said sensors and for calculating the thermal errors;

a digital input/output part operatively connected to said operating part for converting digital data of the thermal errors calculated by said operating part to digital signals;

a controller for receiving the digital signals of the thermal errors of the guideway and the spindle outputted from said digital input/output part and for receiving the positional coordinates of the bed outputted from said encoder and for giving order to compensate the positional coordinates of the bed by the thermal errors calculated by said operating part; and wherein said data bank, said analog to digital converter, said counter, said operation part, and said digital input/output part are formed by a module.

2. In combination as recited as claim 1, wherein gap sensors are provided at upper and lower sides of a master cylinder which is fixed to the spindle to measure degrees of freedom of the spindle.

3. In combination as recited as claim 2, wherein two sensors of the gap sensors are provided at the upper side of the master cylinder and three sensors of the gap sensors are provided at the lower side of the master cylinder.

4. In combination as recited as claim 1, wherein three gap sensors are perpendicularly thereamong provided at a master cylinder which is fixed to the spindle.

5. In combination a machine tool having a guideway and a spindle and a measurement and compensation system for thermal errors in a machine tool comprising, a data bank for storing in operating conditions of the guideway and the spindle of the machine tool, and values of all the coefficients of a thermal error modeling equation which governs a relation between thermal errors and temperatures of the guideway and the spindle;

a plurality of sensors fixed to a plurality of regions of the guideway and the spindle of the machine tool to measure temperatures of the regions of the guideway and the spindle;

an analog to digital converter for converting analog signals of the sensors to digital signal;

an encoder provided near the guideway to measure positional coordinates of a bed which moves rectlinearly by means of rotation of the guideway;

a counter operatively connected to said encoder for detecting the positional coordinates of the bed by counting pulse signals of said encoder;

an operating part for receiving outputs of said analog to digital converter and said counter and for selecting from said data bank the values of all the coefficients of thermal error modeling equation corresponding to the temperatures measured by said sensors and for calculating the thermal errors;

a digital input/output part operatively connected to said operating part for converting the digital data of the thermal errors calculated by said operating part to digital signals; and wherein said data bank, said temperature sensors, said analog to digital converter, said encoder, said counter, said operating part, and said digital input/output part are provided in a controller wherein said controller receives the digital signals of the thermal errors of the guideway and the spindle outputted from said digital input/output part and receives the positional coordinates of the bed outputted from said encoder, and gives order to compensate the positional coordinates of the bed by the thermal errors calculated by said operating part.

6. In combination as recited as claim 5, wherein two gap sensors are provided at upper side of a master cylinder which is fixed to the spindle and three gap sensors are provided at lower side of the master cylinder to measure five degrees of freedom of the spindle.

7. In combination, a machine tool having a guideway and a spindle and a measurement and compensation system for thermal errors in a machine tool comprising, a data bank for storing in operating conditions of the guideway and the spindle of the machine tool, and values of all the coefficients of a thermal error modeling equation which governs a relation between thermal errors and temperatures of the guideway and the spindle;

a plurality of sensors fixed to a plurality of regions of the guideway and the spindle of the machine tool to measure temperatures of the regions of the guideway and the spindle;

an analog to digital converter for converting analog signals of the sensors to digital signal;

an encoder provided near the guideway to measure positional coordinates of a bed which moves rectlinearly by means of rotation of the guideway;

a counter operatively connected to said encoder for detecting the positional coordinates of the bed by counting pulse signals of said encoder;

an operating part for receiving outputs of said analog to digital converter and said counter and for selecting from said data bank the values of all the coefficients of the thermal error modeling equation corresponding to the temperatures measured by said sensors and for calculating the thermal errors;

a digital input/output part operatively connected to said operating part for converting the digital data of the thermal errors calculated by said operating part to digital signals;

a controller for receiving the digital signals of the thermal errors of the guideway and the spindle outputted from said digital input/output part and for receiving the positional coordinates of the bed outputted from said encoder and for giving order to compensate the positional coordinates of the bed by the thermal errors calculated by said operating part; and wherein said data bank, said analog to digital converter, said counter, said operating part, and said digital input/output part are formed as a separate apparatus which communicates in series and in parallel with said controller by communication ports and cables.

\* \* \* \* \*